(12) United States Patent
Clifton-Climas et al.

(10) Patent No.: US 11,313,978 B2
(45) Date of Patent: Apr. 26, 2022

(54) DEVICE FOR DETECTING A CONTAMINANT ON A SCAFFOLDING POLE

(71) Applicant: SOLETANCHE FREYSSINET S.A.S., Rueil-Malmaison (FR)

(72) Inventors: Dan Clifton-Climas, Didcot (GB); Greg Antill, East Hanney (GB)

(73) Assignee: SOLETANCHE FREYSSINET S.A.S., Rueil-Malmaison (FR)

( * ) Notice: Subject to any disclaimer, the term of this patent is extended or adjusted under 35 U.S.C. 154(b) by 0 days.

(21) Appl. No.: 17/252,808

(22) PCT Filed: Jun. 20, 2019

(86) PCT No.: PCT/EP2019/066346
§ 371 (c)(1),
(2) Date: Dec. 16, 2020

(87) PCT Pub. No.: WO2019/243495
PCT Pub. Date: Dec. 26, 2019

(65) Prior Publication Data
US 2021/0263169 A1    Aug. 26, 2021

(30) Foreign Application Priority Data
Jun. 22, 2018   (GB) ..................................... 1810247

(51) Int. Cl.
*G01T 1/167* (2006.01)
*E04G 5/00* (2006.01)
(52) U.S. Cl.
CPC ................ *G01T 1/167* (2013.01); *E04G 5/00* (2013.01)

(58) Field of Classification Search
CPC ................................. G01T 1/167; E04G 5/00
See application file for complete search history.

(56) References Cited

U.S. PATENT DOCUMENTS

| 4,862,005 A | 8/1989 | Johnson et al. |
| 5,881,116 A * | 3/1999 | Hatakeyama ........ G21C 17/017 376/245 |

(Continued)

FOREIGN PATENT DOCUMENTS

| CN | 202033475 U | 11/2011 | |
| EP | 2910976 A1 * | 8/2015 | ............. G01T 1/167 |

(Continued)

OTHER PUBLICATIONS

Notification of Transmittal of the International Search Report and the Written Opinion (Form PCT/ISA/220), International Search Report (Form PCT/ISA/210), and Written Opinion (Form PCT/ISA/237) for International Application No. PCT/EP2019/066346 dated Aug. 21, 2019, 16 pages.

(Continued)

*Primary Examiner* — David P Porta
*Assistant Examiner* — Fani Boosalis
(74) *Attorney, Agent, or Firm* — Withrow & Terranova, P.L.L.C.; Vincent K. Gustafson (57) ABSTRACT

A device for detecting a contaminant on a scaffolding pole. The device includes an outer detector for detecting a contaminant on an outer surface and an inner detector for detecting a contaminant on an inner surface. The device also includes a mechanism for transporting a scaffolding pole through the device, past the detectors. A contaminant is detected on the outer and inner surfaces of the scaffolding pole using the outer and inner detectors respectively.

20 Claims, 3 Drawing Sheets

(56) References Cited

U.S. PATENT DOCUMENTS

2005/0205794 A1  9/2005  Ito et al.
2011/0284752 A1  11/2011  Nakashima et al.

FOREIGN PATENT DOCUMENTS

| EP | 2910976 A1 | | 8/2015 |
|----|------------|---|--------|
| JP | H02114192 A | | 4/1990 |
| JP | H10227865 A | | 8/1998 |
| JP | 2008111688 A | | 5/2008 |
| JP | 2008249692 A | | 10/2008 |
| JP | 6519902 B1 | * | 5/2019 |
| WO | 2013031897 A1 | | 3/2013 |

OTHER PUBLICATIONS

Search Report under Section 17(5) for United Kingdom Patent Application No. GB1810247.5 dated Dec. 24, 2018, 5 pages.

* cited by examiner

Fig. 3

DEVICE FOR DETECTING A CONTAMINANT ON A SCAFFOLDING POLE

This application is a 35 U.S.C. § 371 national phase filing of International Application No. PCT/EP2019/066346 filed on Jun. 20, 2019, and further claims priority to United Kingdom Patent Application No. 1810247.5 filed on Jun. 22, 2018, wherein the disclosures of the foregoing applications are hereby incorporated by reference herein in their respective entireties.

This invention relates to a device for detecting a contaminant on a scaffolding pole.

Scaffolding is used for many different purposes when it is desired to gain access to the inside or the outside of a building, in a situation that would otherwise be inaccessible. Scaffolding is generally constructed from scaffolding poles and scaffolding boards. As well as being used on building sites, scaffolding may be used on sites, such as nuclear establishments, where the scaffolding may be at risk of exposure to contamination, e.g. from radioactive material on a nuclear site.

When scaffolding may have become contaminated during its use, it is important that the scaffolding is not removed from the site to be used elsewhere until it has been checked for the presence of contaminants on the scaffolding. This then allows any uncontaminated scaffolding to be used elsewhere, and any contaminated scaffolding to be disposed of or to be decontaminated as appropriate.

However, no suitably convenient and efficient device or method exists for determining whether or not scaffolding is contaminated. It will be appreciated that scanning scaffolding manually for the presence of contaminants is labour intensive. For these reasons scaffolding poles are often not checked for contamination and thus cannot be released for subsequent use elsewhere owing to the risk of transporting the contamination off site. Therefore, even though only a small percentage of the scaffolding poles and boards on a site may be contaminated, large amounts of scaffolding are prevented from being used elsewhere, leading to large stockpiles of scaffolding on potentially contaminated sites.

The present invention aims to provide an improved device for detecting a contaminant on a scaffolding pole.

When viewed from a first aspect the invention provides a device for detecting a contaminant on a scaffolding pole, wherein the device comprises:

an outer detector for detecting a contaminant on an outer surface of a scaffolding pole;
an inner detector for detecting a contaminant on an inner surface of a scaffolding pole; and
a mechanism for transporting a scaffolding pole longitudinally through the device past the outer detector and past the inner detector.

When viewed from a second aspect the invention provides a method of detecting a contaminant on a scaffolding pole, wherein the method comprises:

transporting a scaffolding pole longitudinally through a device past an outer detector for detecting a contaminant on an outer surface of a scaffolding pole and past an inner detector for detecting a contaminant on an inner surface of a scaffolding pole; and
detecting the presence of a contaminant on the outer and inner surfaces of the scaffolding pole using the outer and inner detectors respectively.

The present invention provides a device and a method that detects the presence of a contaminant on a scaffold pole which is transported through the device by a mechanism. The mechanism transports the device past both an outer detector and an inner detector which are able detect a contaminant on the outer and inner surfaces respectively of the scaffolding pole.

The outer and inner detectors of the device are positioned relative to each other and the mechanism of the device is configured to transport a scaffolding pole longitudinally through the device (i.e. along a path in a direction along the length of the scaffolding pole) such that the scaffolding pole is moved past the outer and inner detectors, such that the outer and inner detectors are able to detect the presence (or absence) of a contaminant on the outer and inner surfaces respectively of the scaffolding pole.

As scaffolding poles are hollow, both their outer and inner surfaces may become contaminated. It will be appreciated that, at least in preferred embodiments, the device of the present invention allows both the inside and the outside of a scaffolding pole to be surveyed for the presence or absence of a contaminant, simply by the scaffolding pole being passed through the device by the transport mechanism past the inner and outer detectors.

The device of the present invention thus helps to allow scaffolding poles to be checked for contamination effectively and conveniently, such that it may allow scaffolding poles that have been used on a site where contamination may be present to be released for subsequent use off site, e.g. subject to being disposed of or decontaminated when necessary. This may greatly reduce the cost of scaffolding to, e.g. nuclear, establishments on which scaffolding poles have the potential to become contaminated.

The device (and thus the inner and outer detectors) may be arranged to detect any suitable and desired type of contaminant on a scaffolding pole. In one set of embodiments the contaminant comprises radioactive material. Radioactive materials are conveniently detected by their emission of one or more of alpha particles, beta particles (electrons or positrons) and gamma radiation (photons). The radioactive materials may be present on the scaffolding pole, e.g. when it has been used in a nuclear facility.

It will be appreciated that it is particularly important to detect whether or not scaffolding poles are contaminated by radioactive material, so that it can be determined whether or not the scaffolding poles are safe to release for use outside of the nuclear facility, or need to be disposed of or decontaminated, as appropriate.

The inner and outer detectors could comprise any suitable and desired detectors for detecting the contaminant (e.g. radioactive material) that may be present on the scaffolding pole being processed by the device, e.g. dependent upon the type of contaminant expected to be detected. However, as has been discussed above, the device of the present invention is particularly suitable for surveying scaffolding poles which may be contaminated with radioactive material(s). Therefore in one set of embodiments the inner and outer detectors each comprise a radiation monitor, e.g. a Geiger counter, an alpha radiation survey meter, an ion chamber, a scintillation counter, a dose rate meter or a gamma ray spectrometer.

The type of radiation monitor used for each of the inner and outer detectors could be chosen dependent upon the type of radioactive materials expected to be detected. For example, if the scaffolding poles are being process to the detect the presence of a particular radioactive isotope (e.g. owing to the radioactive materials that the scaffolding poles are known to have potentially been exposed), which is known to decay by the emission of alpha particles, then an alpha radiation survey meter may be used. However, if the radioactive materials are not known, there may be more than one type of radioactive particles being emitted, or a general survey of the radioactivity on a scaffolding pole is desired, then a general purpose radiation monitor could be used, e.g. a combined alpha/beta radiation detector.

Typically radiation monitors detect a rate of decay of the radioactive materials, e.g. counts per second, and thus in one set of embodiments the data captured by each of the inner and outer detectors comprise a rate which is representative of the concentration of the contaminant, e.g. the radioactive material. More generally, preferably the inner and outer detectors are arranged to capture data representative of a contaminant as a scaffolding pole is transported through the device past the inner and outer detectors.

In one set of embodiments the inner and outer detectors are each arranged to detect the energy of the radioactive particles, e.g. preferably the inner and outer detectors each comprises a radiation spectrometer. In this set of embodiments preferably the data captured by the inner and outer detectors each comprise data representative of the energy of the radioactive particles detected by the inner and outer detectors respectively.

This captured data may then be recorded by and/or transmitted from the device, e.g. the device preferably comprises a data recorder and/or transmitter for recording and/or transmitting the captured data respectively. This helps to allow data for each of the scaffolding poles surveyed to be stored for further analysis.

The inner and outer detectors are preferably positioned relative (e.g. adjacent) to the (e.g. same longitudinal) path along which a scaffolding pole is transported through the device, such that the pole is moved past the inner and outer detectors (e.g. simultaneously), thus helping to allow the inner and outer detectors to be able to detect the presence (or absence) of a contaminant on the scaffolding pole.

The outer detector may be arranged in any suitable and desired configuration for detecting a contaminant on an outer surface of a scaffolding pole. Preferably the outer detector is arranged to extend substantially around the circumference of a scaffolding pole to be surveyed by the device. This helps to allow the whole of the outer surface of a scaffolding pole to be surveyed as it is transported through the device.

The outer detector preferably comprises a segmented detector comprising a plurality of discrete parts, e.g. each part arranged to detect a contaminant on an outer surface of a scaffolding pole. This may, for example, help to allow the outer detector to be arranged around the outer circumference of a scaffolding pole to be surveyed. The outer detector may comprise two parts, e.g. a clamshell detector, but preferably the segmented outer detector comprises three or four discrete parts.

Preferably the outer detector is spaced from the outer surface of a scaffolding pole to be surveyed by the device (e.g. spaced from the path along which a scaffolding pole is transported through the device). This helps to avoid the outer detector from coming into contact with the scaffolding poles and thus potentially becoming contaminated by the contaminant that may be present on the outer surface of the scaffolding poles. It will be appreciated that it may be important to avoid the detectors from coming into contact with a contaminant, to avoid the contaminant detection measurements for a subsequent scaffolding pole to be distorted owing to a detector detecting a contaminant that is on the detector, particularly for contaminants such as radioactive material.

To space the outer detector from the outer surface of a scaffolding pole, as well as the transport mechanism transporting a scaffolding pole longitudinally (i.e. straight) through the device (along substantially a longitudinal projection of the cross-section of the scaffolding pole), preferably the minimum inner dimension of the outer detector (in a plane perpendicular to the direction along which a scaffolding pole is transported) is greater than the maximum outer dimension (e.g. diameter) of a scaffolding pole.

The inner detector may be arranged in any suitable and desired configuration for detecting a contaminant on an inner surface of a scaffolding pole. In one embodiment the inner detector comprises a (e.g. substantially cylindrical) detector arranged to fit into the inner bore of a scaffolding pole. Preferably the inner detector is arranged to pass through the inner bore of a scaffolding pole as the scaffolding pole is transported through the device. Preferably the inner detector is arranged to detect the contaminant around substantially the full inner circumference of a scaffolding pole. This helps to allow the whole of the inner surface of a scaffolding pole to be surveyed as it is transported through the device.

Preferably the inner detector is spaced from the inner surface of a scaffolding pole to be surveyed by the device. This helps to avoid the inner detector from coming into contact with the scaffolding poles and thus potentially becoming contaminated by the contaminant that may be present on the inner surface of the scaffolding poles. Thus preferably the inner detector has a maximum outer diameter (in a plane perpendicular to the direction along which a scaffolding pole is transported) that is less than the inner diameter of a scaffolding pole.

Preferably the device comprises a collar arranged around the inner detector to position the inner detector inside a scaffolding pole as the scaffolding pole is transported through the device. Such a centring collar helps to prevent the inner detector coming into contact with the scaffolding poles and helps to space the inner detector equidistantly from the inner surface of the scaffolding poles which helps to remove any dependence on distance in the contaminant measurements the inner detector is taking.

Preferably the device is arranged to read out the data captured by the outer detector and the inner detector. Thus preferably the outer detector and the inner detector are connected to the data recorder and/or the data transmitter, such that the data captured by the outer detector and the inner detector can be read out to the data recorder and/or the data transmitter. Preferably the connections comprise wired connections.

It will be appreciated that a wired connection to the inner detector needs to be able to pass through the length of a scaffolding pole. Preferably the device comprises a cable handling mechanism (e.g. a freewheel) for feeding the wired connection (e.g. cable) through a scaffolding pole (from the inner detector to the data recorder and/or the data transmitter) as the scaffolding pole is transported through the device. This helps to protect the wired connection to the inner detector from coming into contact with the scaffolding pole and thus from becoming contaminated.

The mechanism for transporting a scaffolding pole longitudinally through the device may comprise any suitable and desired transporter. In one embodiment the transport mechanism comprises a conveyor belt or (e.g. driven) set of rollers. In one embodiment the transport mechanism comprises a connector (e.g. a clamp or grabber) for attaching to (e.g. an end of) a scaffolding pole, so that the transport mechanism can transport (e.g. pull or push) the scaffolding pole through the device. When the transport mechanism comprises a connector for attaching to the scaffolding pole, the device may also comprise a (e.g. passive) set of rollers (such as a roller bed support), e.g. to guide a scaffolding pole as it is transported through the device.

Preferably the transport mechanism comprises a motor arranged to drive the transport mechanism. Preferably the motor is arranged (e.g. energised) to drive the connector. Thus in a preferred embodiment the connector is arranged to attach to a scaffolding pole, and the motor is arranged to drive the connector to transport the scaffolding pole through the device. Preferably the motor comprises a stepper motor.

In one embodiment the transport mechanism is arranged to determine (and, e.g., capture data representative of) the distance a scaffolding pole has been transported through the device, as the scaffolding pole is being transported through the device. This helps to allow the position(s) of a contaminant on a scaffolding pole detected by the inner and outer detectors to be determined. It will be appreciated that when the transport mechanism comprises a stepper motor, the stepper motor allows the distance a scaffolding pole has been transported through the device to be determined easily.

Preferably the device is arranged to read out the data (i.e. the determination of the distance) captured by the transport mechanism. Thus preferably the transport mechanism is connected to the data recorder and/or the data transmitter, such that the data captured by the transport mechanism can be read out to the data recorder and/or the data transmitter. Preferably the connections comprise wired connections.

Preferably the data captured by the inner and outer detectors for a scaffolding pole is associated with the data captured by the transport mechanism for the scaffolding pole, e.g. to correlate a contaminant detected with its position along the length of a scaffolding pole. Preferably the device is arranged to associate the data captured by the inner and outer detectors with the data captured by the transport mechanism for a scaffolding pole, e.g. by a control. The data associated with each other may then be written to the data recorder and/or the data transmitter.

When the device comprises a cable handling mechanism, preferably the cable handling mechanism is attached to the transport mechanism, e.g. to the connector. This helps to feed the wired connection to the inner detector, past the transport mechanism, as the transport mechanism transports a scaffolding pole through the device.

In one embodiment the device comprises a cutting mechanism arranged to cut through a scaffolding pole. Preferably the cutting mechanism is arranged to remove a contaminated part of a scaffolding pole. This allows the device to remove a part of a scaffolding pole that has been detected to be contaminated by the inner and outer detectors. The cutting mechanism may comprise any suitable and desired cutter to cut through the diameter of a scaffolding pole, e.g. a circular saw or angle grinder.

Preferably the cutting mechanism is arranged to use the determination of the distance at which contamination has been detected on a scaffolding pole, to determine where to cut the scaffolding pole. Thus preferably the cutting mechanism is (e.g. electrically) connected to the transport mechanism, e.g. via a control, so to receive the determination of the distance (e.g. the captured data) from the transport mechanism. Preferably the cutting mechanism is (e.g. electrically) connected to the inner and outer detectors, e.g. via a control, so to receive the detection of a contaminant (e.g. the captured data) from the inner and outer detectors.

In one embodiment the device comprises a marking mechanism arranged to mark a scaffolding pole. Preferably the marking mechanism is arranged to mark a scaffolding pole with an (e.g. unique) identification for the scaffold pole. This allows the scaffolding poles surveyed by the device to be asset marked, enabling them to be tracked after they have surveyed.

In one embodiment the marking mechanism is arranged to mark a contaminated part of a scaffolding pole. This allows the device to mark a part of a scaffolding pole that has been detected to be contaminated by the inner and outer detectors, e.g. so that contaminated (e.g. parts of) scaffolding poles may be identified easily. The marking mechanism may comprise any suitable and desired marker to mark (e.g. the outer surface of) a scaffolding pole, e.g. a laser etcher or a sticker applicator.

Preferably the marking mechanism is arranged to use the determination of the distance at which contamination has been detected on a scaffolding pole, to determine where to mark the scaffolding pole. Thus preferably the marking mechanism is (e.g. electrically) connected to the transport mechanism, e.g. via a control, so to receive the determination of the distance (e.g. the captured data) from the transport mechanism. Preferably the marking mechanism is (e.g. electrically) connected to the inner and outer detectors, e.g. via a control, so to receive the detection of a contaminant (e.g. the captured data) from the inner and outer detectors.

In one embodiment the data captured by the inner and outer detectors for a scaffolding pole is associated with an identification of the scaffolding pole (e.g. as marked on the scaffolding pole by the marking mechanism). This allows scaffolding poles that have been scanned to be identified as being contaminated or not.

Preferably the device is arranged to associate the data captured by the inner and outer detectors with the identification of a scaffolding pole for a scaffolding pole, e.g. by a control. The data associated with each other may then be written to the data recorder and/or the data transmitter.

In one embodiment the device is arranged to detect a contaminant on a scaffolding board. Thus preferably the device comprises a detector for detecting a contaminant on a scaffolding board; and a mechanism for transporting a scaffolding board longitudinally through the device past the detector.

It will be appreciated that one, more or all of the preferred and optional features described herein with reference to a scaffolding pole may, and in preferred embodiments do, apply equally to a scaffolding board.

While the device may be arranged to transport both scaffolding poles and scaffolding boards past the same set of detectors, e.g. the outer detector for detecting a contaminant on a scaffolding pole may double as the detector for detecting a contaminant on a scaffolding board, as may the transport mechanism. However, owing to the different cross-sectional dimensions of scaffolding poles and boards, this may not always be convenient. Therefore, in one set of embodiments the device comprises the detector and the transport mechanism for a scaffolding board in addition to the inner and outer detectors, and the transport mechanism for a scaffolding pole.

In one set of embodiments the device is a portable device. This allows the device to be transported to different sites for surveying scaffolding poles (and boards) on site. In one embodiment the device is mounted on a trailer.

Preferably the device comprises, or is arranged to be attached to, a source of (e.g. electrical) power. The source of power may be used by one, more or all of the components of the device, e.g. the detectors, the transport mechanism, the cutting mechanism, the marking mechanism, the data capture system, etc.

A preferred embodiment of the invention will now be described, by way of example only, with reference to the accompanying drawings in which.

When scaffolding is used on site in a nuclear establishment, it is important that the scaffolding is surveyed for the presence of radioactive material, before it can be allowed to leave the site to be used elsewhere. This allows the scaffolding to be confirmed either as not being contaminated with radioactive material or as having radioactive material present on the scaffolding. For scaffolding falling into the former category, this can be released for use off site; for the latter, this scaffolding should then be appropriately decontaminated or disposed of.

A preferred embodiment of a device to perform such surveying will now be described.

Figure 1:
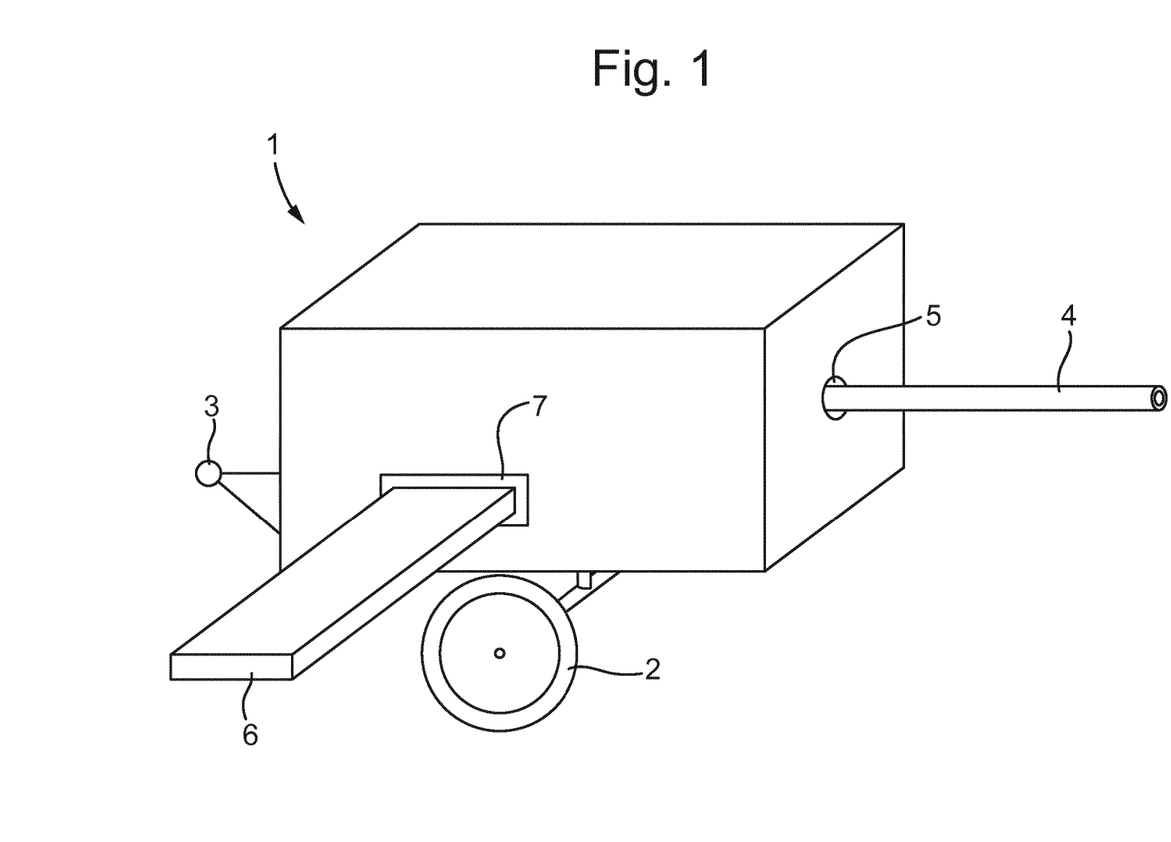
FIG. 1 shows a device for surveying potentially contaminated scaffolding according to a preferred embodiment of the present invention.

FIG. 1 shows a device for surveying potentially contaminated scaffolding according to a preferred embodiment of the present invention. FIG. 1 shows a portable device 1 in the form of a trailer, i.e. having wheels 2 and a tow-bar 3 such that it is able to be attached to a vehicle. This allows the device 1 to be transported between locations which hold potentially contaminated scaffolding to survey the scaffolding.

The device 1 is able to survey both scaffolding poles and scaffolding boards. As shown in FIG. 1, a scaffolding pole 4 is being fed horizontally and longitudinally into a circular aperture 5 on the rear of the device 1, such that the scaffolding pole 4 can be transported through the device 1 and surveyed. FIG. 1 also shows a scaffolding board 6 being fed horizontally longitudinally into a rectangular aperture 7 on the side of the device 1, such that the scaffolding board 6 can be transported through the device 1 and surveyed.

Figure 2:
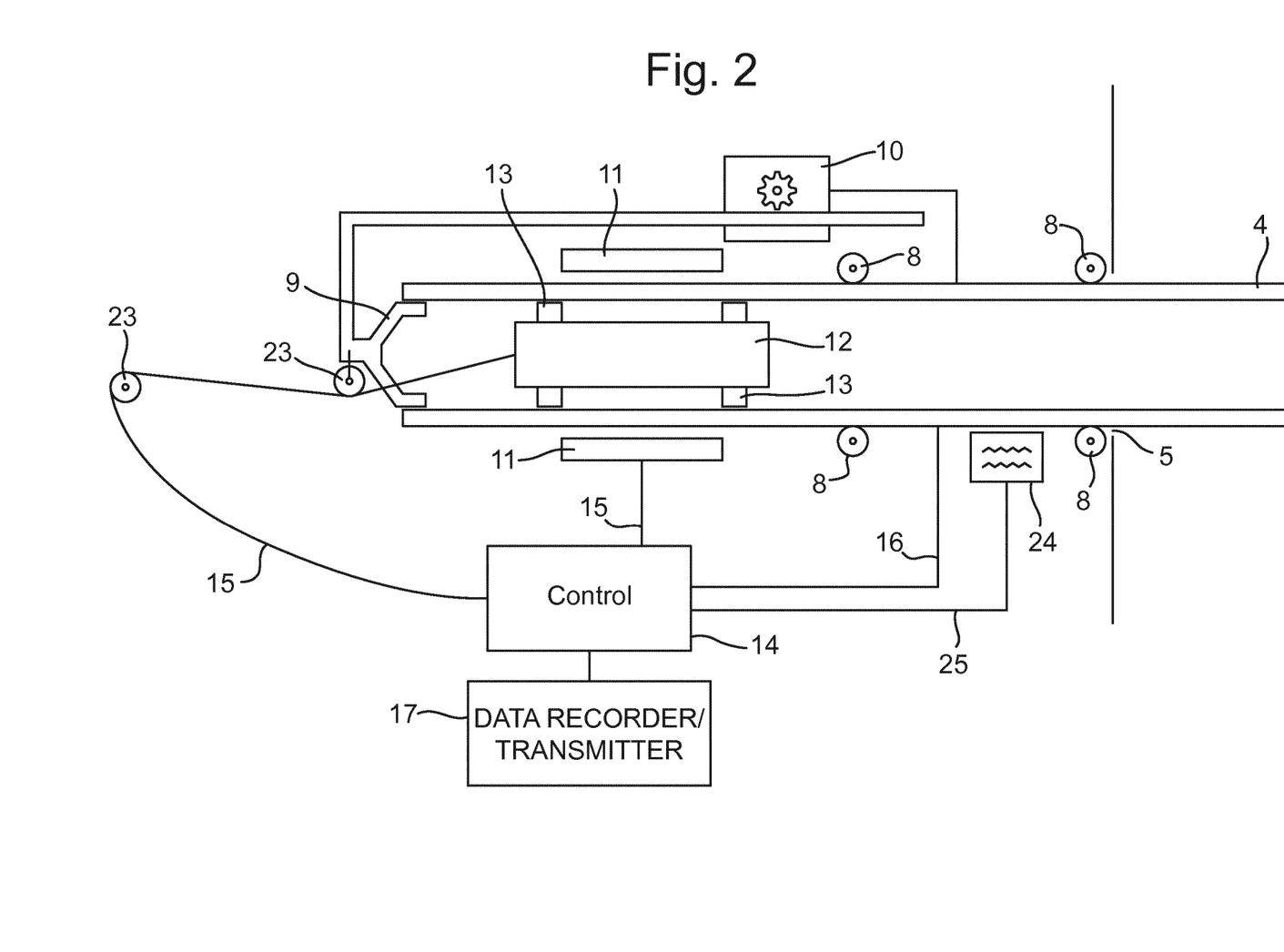
FIG. 2 shows a cross-sectional view of the interior of the device shown in FIG. 1, showing how a scaffolding pole is surveyed, according to a preferred embodiment of the present invention.

FIG. 2 shows a cross-sectional view of the interior of the device shown in FIG. 1, showing how a scaffolding pole is surveyed, according to a preferred embodiment of the present invention. FIG. 2 shows a scaffolding pole 4 being fed through the aperture 5 on the rear of the device 1. Sets of rollers 8 guide the scaffolding pole 4 through the device 1.

The scaffolding pole 4 is transported (pulled) through the device 1 by a connector 9 that attaches to the inner diameter of the scaffolding pole 4. The connector 9 is connected to, and driven by, a stepper motor 10. Together with the sets of rollers 8, the stepper motor 10 and the connector 9 pull the scaffolding pole 4 in a straight line, longitudinally through the device 1.

The scaffolding pole 4 is pulled past an outer, segmented radiation detector 11 which surrounds, and is spaced from, the outer diameter of the scaffolding pole 4. By extending circumferentially around the scaffolding pole 4, the outer radiation detector 11 is configured to survey the whole of the outer surface of the scaffolding pole 4 for the presence of radioactive material as the scaffolding pole 4 is transported past the outer radiation detector 11.

The scaffolding pole 4 is also pulled past an inner, cylindrical radiation detector 12 which fits inside the inner diameter of the scaffolding pole 4. The inner radiation detector 12 is spaced from the inner diameter of the scaffolding pole 4 by a pair of collars 13. The inner detector 12 is configured to survey the inner surface of the scaffolding pole 4 for the presence of radioactive material as the scaffolding pole 4 is transported past the inner radiation detector 12.

The outer and inner detectors 11, 12 are each connected to a control 14 via respective wired connections 15. The wired connection 15 from the inner detector 12 is routed round freewheels 23 to prevent the wired connection 15 from coming into contact with the scaffolding pole 4.

The scaffolding pole 4 is also pulled past an asset marker 24 which is arranged to mark the outside of the scaffolding pole 4 with an asset ID. The asset marker 24 is connected to the control 14 via a wired connection 25, such that the asset ID marked on each scaffolding pole 4 surveyed can be transmitted to the control 14.

The stepper motor 10 is also connected to the control 14 via a wired connection 16. The control 14 receives the data captured by the outer and inner detectors 11, 12 (i.e. representative of any radioactive material that they detect on a scaffolding pole 4 being surveyed).

The control 14 also receives data from the stepper motor 10 representative of the distance through which a scaffolding pole 4 has been transported through the device 1. This allows the data received by the control 14 from the outer and inner detectors 11, 12 to be associated with the data received from the stepper motor 10 by the control 14, and with the asset ID from the asset marker 24.

The control 14 is connected to a data recorder or transmitter 17 so that the captured data can be recorded or transmitted from the device 1 for further use and analysis.

Figure 3:
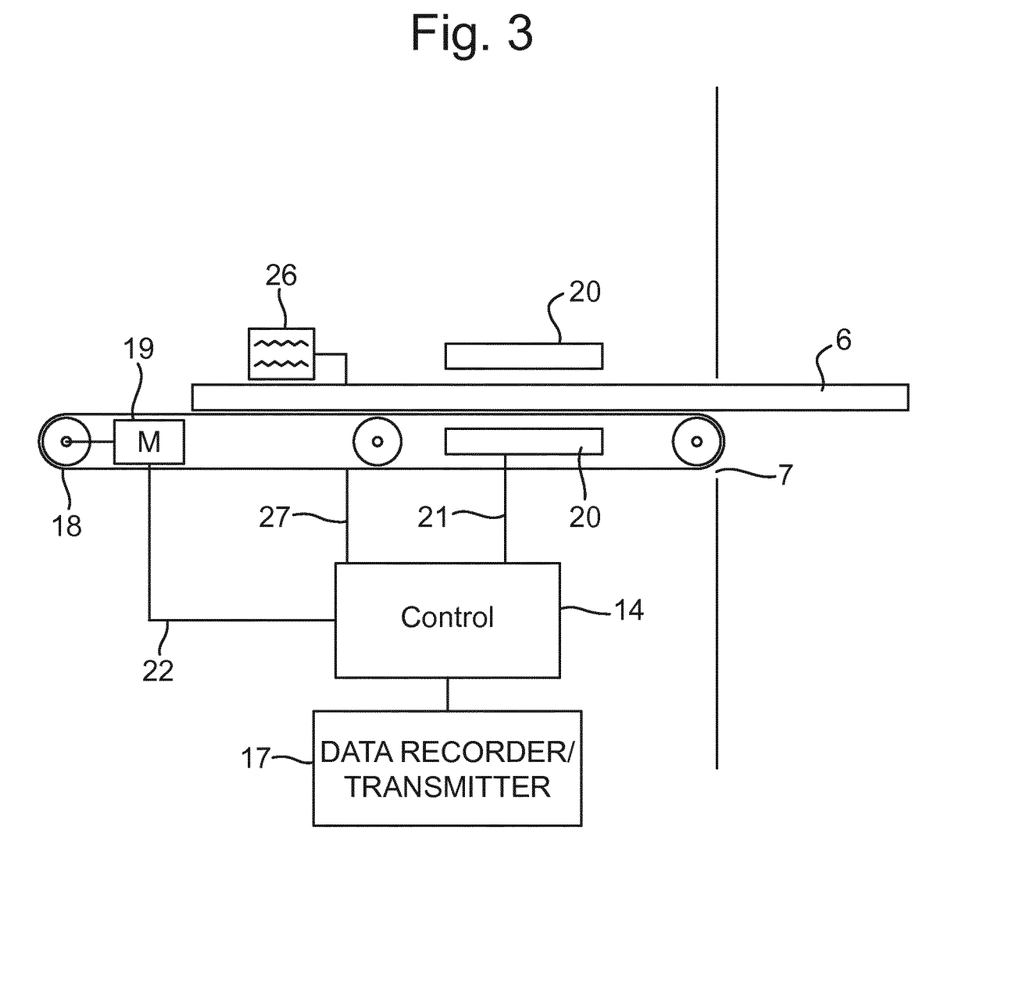
FIG. 3 shows a cross-sectional view of the interior of the device shown in FIG. 1, showing how a scaffolding board is surveyed, according to a preferred embodiment of the present invention.

FIG. 3 shows a cross-sectional view of the interior of the device shown in FIG. 1, showing how a scaffolding board is surveyed, according to a preferred embodiment of the present invention. FIG. 3 shows a scaffolding board 6 being fed through the aperture 7 on the side of the device 1.

The scaffolding board 6 is transported in a straight line, longitudinally through the device 1 by a conveyor belt 18 which is driven by a motor 19. The scaffolding board 6 is pulled past a radiation detector 20 which surrounds, and is spaced from, the outer surface of the scaffolding board 6. Thus the radiation detector 20 is configured to survey the whole of the outer surface of the scaffolding board 6 for the presence of radioactive material as the scaffolding board 6 is transported past the radiation detector 20.

The radiation detector 20 is connected to the control 14 via a wired connection 21. The motor 19 is also connected to the control 14 via a wired connection 22 The control 14 receives the data captured by the radiation detector 20 (i.e. representative of any radioactive material that it detects on a scaffolding board 6 being surveyed).

The scaffolding board 6 is also pulled past an asset marker 26 which is arranged to mark the outside of the scaffolding board 6 with an asset ID. The asset marker 26 is connected to the control 14 via a wired connection 27, such that the asset ID 30 marked on each scaffolding board 6 surveyed can be transmitted to the control 14.

The control 14 also receives data from the conveyor belt motor 19 representative of the distance through which a scaffolding board 6 has been transported through the device 1. This allows the data received by the control 14 from the radiation detector 20 to be associated with the data received from the conveyor belt motor 19 by the control 14, and with the asset ID from the asset marker 26.

Operation of the device 1 will now be described with reference to FIGS. 1-3.

The portable device 1 is first towed by a vehicle to a nuclear establishment where there are scaffolding poles and boards to be surveyed that may be contaminated with radioactive material. The scaffolding poles are surveyed by taking a scaffolding pole 4 and inserting it lengthways into the rear aperture 5 of the device, as shown in FIG. 1. The connector 9 (arranged to be adjacent the aperture 5 to receive the scaffolding pole 4) attaches itself to the end of the scaffolding pole 4, as shown in FIG. 2.

With the connector 9 attached to the scaffolding pole 4, the stepper motor 10 is energised to transport the scaffolding pole 4 through the device. During operation of the stepper motor 10, data representative of the distance that the connector 9 (and thus the scaffolding pole 4) has travelled through the device is transmitted along the wired connection 16 to the control 14.

The connector 9, driven by the stepper motor 10, pulls the scaffolding pole 4 through the outer radiation detector 11 and around the inner radiation detector 12. The inner detector 12 fits inside the inner bore of the scaffolding pole 4 and is spaced from the inner surface of the scaffolding pole 4 by the collar 13 around the inner detector 12. The connector 9 also pulls the scaffolding pole 4 past the asset marker 24 which marks the scaffolding pole 4 with a unique asset ID that is transmitted to the control 14 for recording.

As the scaffolding pole 4 is transported past the outer radiation detector 11 and the inner radiation detector 12, each of the outer and inner detectors 11, 12 measures the radiation count rate of any radioactive material that is present on the outer and inner surfaces respectively of the scaffolding pole 4. This data captured by the outer and inner detectors 11, 12 is transmitted along the wired connection 16 to the control 14.

The control 14, upon receipt of the captured data from the stepper motor 10 and the outer and inner detectors 11, 12, associates the data representative of the radiation count rates with the data representative of the distance through which the scaffolding pole 4 has been transported, so to determine the location of any radioactive material detected on the scaffolding pole 4. The data is then written out to the data recorder or transmitter 17 with the asset ID for that scaffolding pole 4.

The scaffolding boards are surveyed in a very similar manner to the scaffolding poles. Each scaffolding board 6 is taken and inserted lengthways into the side aperture 7 of the device 1, as shown in FIG. 1. The scaffolding board 6 is laid upon the conveyor belt 18 to transport the scaffolding board 6 through the device 1 (as shown in FIG. 3).

With the scaffolding board 6 lying on the conveyor belt 18, the conveyor belt motor 19 is energised to transport the scaffolding board 6 through the device. During operation of the conveyor belt motor 19, data representative of the distance that the conveyor belt 18 (and thus the scaffolding board 6) has travelled through the device 1 is transmitted along the wired connection 22 to the control 14.

The conveyor belt 18, driven by the conveyor belt motor 19, pulls the scaffolding board 6 through the radiation detector 20. The conveyor belt 18 also pulls the scaffolding board 6 past the asset marker 26 which marks the scaffolding board 6 with a unique asset ID that is transmitted to the control 14 for recording.

As the scaffolding board 6 is transported past the radiation detector 20, the radiation detector 20 measures the radiation count rate of any radioactive material that is present on the scaffolding board 6. This data captured by the radiation detector 20 is transmitted along the wired connection 21 to the control 14.

The control 14, upon receipt of the captured data from the conveyor belt motor 19 and the radiation detector 20, associates the data representative of the radiation count rates with the data representative of the distance through which the scaffolding board 6 has been transported, so to determine the location of any radioactive material detected on the scaffolding board 6. The data is then written out to the data recorder or transmitter 17 with the asset ID for that scaffolding board 6.

Once the scaffolding poles and boards have been surveyed, the data collected allows it to be determined which of the scaffolding poles and boards are contaminated with radioactive material. These scaffolding poles and boards are sent for decontaminating (or for disposal) and the remainder of the scaffolding poles and boards (which have been determined not to have any radioactive material (or a safe level) on them) are cleared for releasing from the site of the nuclear facility for use elsewhere.

It can be seen from the above that, in at least preferred embodiments, the device and method of the present invention device help to allow scaffolding to be checked for contamination effectively and conveniently. This helps to allow scaffolding that has been used on a site where contamination may be present to be released for subsequent use off site, e.g. subject to being disposed of or decontaminated when necessary. This may greatly reduce the cost of scaffolding to, e.g. nuclear, establishments on which scaffolding poles have the potential to become contaminated.

It will be appreciated that embodiments of the present invention may comprise a number of alternative and additional features to those shown in FIGS. 1-3. For example, the device may be configured to detect any suitable and desired type of contaminant, e.g. by using appropriate detectors. The device may, for example, comprise cutter(s) configured to cut parts off the scaffolding poles and/or the scaffolding boards which have been determined to be contaminated.

The invention claimed is:

1. A device for detecting a contaminant on a scaffolding pole, wherein the device comprises:
    an outer detector for detecting a contaminant on an outer surface of the scaffolding pole;
    an inner detector for detecting a contaminant on an inner surface of the scaffolding pole; and
    a transport mechanism for transporting the scaffolding pole longitudinally through the device past the outer detector and past the inner detector;
    wherein the outer detector is arranged to extend substantially around a circumference of the scaffolding pole, such that a whole of the outer surface of the scaffolding pole is surveyed as the scaffolding pole is transported through the device.

2. The device as claimed in claim 1, wherein the inner detector comprises a radiation monitor and the outer detector comprises a radiation monitor.

3. The device as claimed in claim 1, wherein the outer detector comprises a segmented detector.

4. The device as claimed in claim 1, wherein the outer detector is spaced from a path along which the scaffolding pole is transported through the device.

5. The device as claimed in claim 1, wherein the inner detector comprises a substantially cylindrical detector arranged to fit into an inner bore of the scaffolding pole.

6. The device as claimed in claim 1, wherein the device comprises a collar arranged around the inner detector to space the inner detector from the inner surface of the scaffolding pole.

7. The device as claimed in claim 1, wherein the device comprises a data recorder and/or transmitter for recording and/or transmitting data captured by the device.

8. The device as claimed in claim 7, wherein the outer detector and the inner detector are connected to the data recorder and/or the data transmitter.

9. The device as claimed in claim 8, wherein the inner detector is connected to the data recorder and/or the data transmitter via a wired connection, and the device comprises a cable handling mechanism for feeding the wired connection through the scaffolding pole as the scaffolding pole is transported through the device.

10. The device as claimed in claim 1, wherein the transport mechanism comprises a connector for attaching to the scaffolding pole.

11. The device as claimed in claim 10, wherein the transport mechanism comprises a stepper motor arranged to drive the connector to transport the scaffolding pole through the device.

12. The device as claimed in claim 1, wherein the transport mechanism is arranged to determine the distance the scaffolding pole has been transported through the device, as the scaffolding pole is being transported through the device.

13. The device as claimed in claim 1, wherein the device is arranged to associate data captured by the inner and outer detectors with data captured by the transport mechanism for the scaffolding pole.

14. The device as claimed in claim 1, wherein the device comprises a marking mechanism arranged to mark the scaffolding pole.

15. The device as claimed in claim 14, wherein the marking mechanism is arranged to use a determination of a distance at which contamination has been detected on the scaffolding pole, to determine where to mark the scaffolding pole.

16. The device as claimed in claim 1, wherein the device comprises a cutting mechanism arranged to cut through the scaffolding pole.

17. The device as claimed in claim 16, wherein the cutting mechanism is arranged to use a determination of a distance at which contamination has been detected on the scaffolding pole, to determine where to cut the scaffolding pole.

18. The device as claimed in claim 1, wherein the device comprises a detector for detecting a contaminant on a scaffolding board; and a mechanism for transporting a scaffolding board longitudinally through the device past the detector.

19. The device as claimed in claim 1, wherein the device is portable.

20. A method of detecting a contaminant on a scaffolding pole, wherein the method comprises:
   transporting a scaffolding pole longitudinally through a device past an outer detector for detecting a contaminant on an outer surface of the scaffolding pole and past an inner detector for detecting a contaminant on an inner surface of the scaffolding pole; and
   detecting the presence of a contaminant on the outer and inner surfaces of the scaffolding pole using the outer and inner detectors, respectively;
   the outer detector being arranged to extend substantially around a circumference of the scaffolding pole, such that a whole of the outer surface of the scaffolding pole is surveyed as the scaffolding pole is transported through the device.

* * * * *